(No Model.)

F. F. ADAMS.
Crank Attachment.

No. 234,841. Patented Nov. 30, 1880.

Witnesses
Frank W. Griswold
Chas. J. Coughlin

Inventor
F. F. Adams
Per Jno K Hallock
Atty

UNITED STATES PATENT OFFICE.

FRANKLIN F. ADAMS, OF ERIE, PENNSYLVANIA.

CRANK ATTACHMENT.

SPECIFICATION forming part of Letters Patent No. 234,841, dated November 30, 1880.

Application filed June 3, 1880. (No model.)

*To all whom it may concern:*

Be it known that I, FRANKLIN F. ADAMS, of Erie, in the county of Erie and State of Pennsylvania, a citizen of the United States, have invented certain new and useful Improvements in Crank Attachments; and I do hereby declare the following to be a full, clear, and exact description of my said invention, reference being had to the accompanying drawings, and the letters of reference marked thereon, such as will enable others skilled in the art to which it appertains to make and use the said invention.

My invention consists in providing a cheap and effective means for attaching cranks to shafts—such, for example, as the crank of a clothes-wringer to the shaft of one of the rollers of said wringer.

One of the most common modes of fastening now used consists in cutting a screw-thread on the end of the shaft, and also one in the eye of the crank, and then screwing the crank onto the shaft, after which another nut is screwed onto the shaft end outside of the crank, which latter nut serves as a jam-nut and prevents the crank unscrewing when turned in the direction which would cause it to unscrew.

Another method consists in squaring the shaft and making the eye in the crank square, and then using a pin through the shaft, or a jam-nut for keeping the crank on the shaft.

My device will fully appear in the following description.

Figure 1:
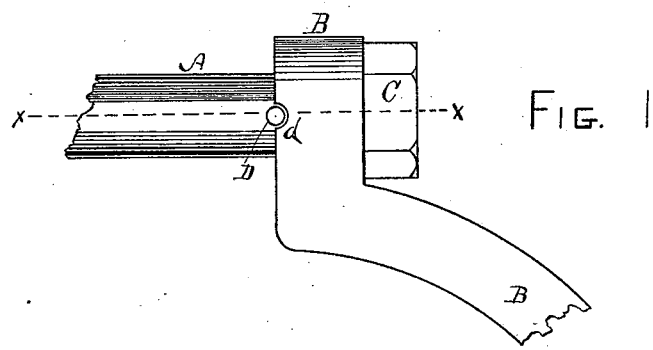
Figure 2:
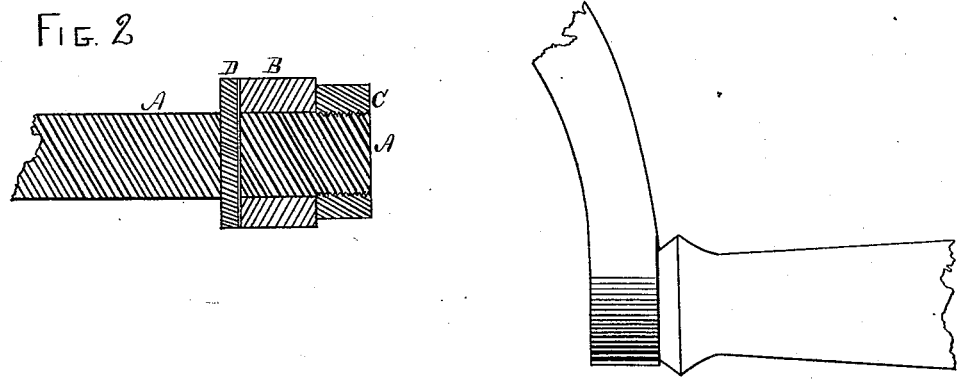

In the drawings, Figure 1 represents a side view of a shaft and crank with my device for attaching the crank employed. Fig. 2 is a section on the line *x x*.

A is the shaft, which is round, and is provided with a screw-thread for a jam-nut, C. B is the crank, and is provided with a round eye and slips loosely on the shaft. D is a pin, which passes through the shaft at a point which will be partially covered by the crank when the jam-nut is screwed up.

On the inner face of the crank, on each side of the eye, is a notch, *d*, which is of about the same size as the pin D, and which, when the crank is on the shaft and the jam-nut C is screwed up, will partially embrace the pin D, as seen at Fig. 1 in the drawings. The pin D and notch *d*, when in that position, act as a clutch, the jam-nut serving to keep them in position. Any device which will keep them in position may be substituted for the jam-nut.

The advantage of this fastening is, that it is cheap and effectual.

The screw-thread on the shaft is less than half as long as when a thread is cut in the eye of the crank; consequently more than half the time is saved. No thread at all is cut in the eye of the crank, and the hole for the pin D can be drilled much quicker than the thread can be cut in the eye of the crank.

The notch *d* is formed in the crank very quick if the crank is of wrought metal; but in the case of clothes-wringers and washing-machines and many other machines the cranks are made of malleable cast-iron, and the notch is formed in the mold, and hence requires no labor at all.

In case of the squared shaft more labor is required than when the shaft and crank-eye are screw-threaded.

Where the shaft A is of malleable cast-iron, as is often the case, lugs may be cast on it to serve the purpose of the pin D; but, of course, in that case the shaft could be squared in the mold at the point where the crank is, and my device would not be needed.

My device is intended more particularly for use where the shaft is of wrought-iron, as it is in that case that it is the most economical.

What I claim as new is—

The device for attaching cranks to shafts herein described, consisting of the combination, substantially as shown, with the crank B and shaft A, of the pin D and notch *d* on the inside of the crank and the nut C or other fastening on the outside of said crank.

In witness whereof I have hereunto set my hand in the presence of two witnesses.

FRANKLIN F. ADAMS.

Witnesses:
JNO. K. HALLOCK,
FRANK W. GRISWOLD.